(12) United States Patent
Murase et al.

(10) Patent No.: US 8,578,438 B2
(45) Date of Patent: Nov. 5, 2013

(54) CONTENT SUPPLY SYSTEM, CONTENT SUPPLY APPARATUS AND METHOD, CONTENT PLAYBACK APPARATUS AND METHOD, AND PROGRAM

(75) Inventors: Yasuhiro Murase, Tokyo (JP); Takeshi Iwatsu, Kanagawa (JP); Noriyuki Sakoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 1078 days.

(21) Appl. No.: 11/132,094

(22) Filed: May 17, 2005

(65) Prior Publication Data
US 2005/0262546 A1 Nov. 24, 2005

(30) Foreign Application Priority Data

May 19, 2004 (JP) ............................... P2004-149030

(51) Int. Cl.
*H04N 7/173* (2011.01)
(52) U.S. Cl.
USPC ........ 725/134; 725/1; 725/9; 725/22; 725/23; 725/25; 725/32; 725/37; 725/62; 725/86
(58) Field of Classification Search
USPC ........ 725/25, 134, 1, 9, 22, 23, 32, 37, 62, 86
See application file for complete search history.

(56) References Cited

U.S. PATENT DOCUMENTS

| | | | | |
|---|---|---|---|---|
| 7,263,497 | B1 * | 8/2007 | Wiser et al. ...................... | 705/51 |
| 7,415,439 | B2 * | 8/2008 | Kontio et al. ..................... | 705/53 |
| 2002/0107809 | A1 * | 8/2002 | Biddle et al. ..................... | 705/59 |
| 2003/0195974 | A1 * | 10/2003 | Ronning et al. .................. | 709/230 |
| 2003/0200458 | A1 * | 10/2003 | Hori et al. ........................ | 713/200 |
| 2004/0025058 | A1 * | 2/2004 | Kuriya et al. .................... | 713/201 |
| 2005/0091508 | A1 * | 4/2005 | Lee et al. ......................... | 713/182 |
| 2009/0187995 | A1 * | 7/2009 | Lopatic ............................ | 726/31 |

FOREIGN PATENT DOCUMENTS

| | | |
|---|---|---|
| JP | 1991-252818 | 12/1991 |
| JP | 2001-075786 | 3/2001 |
| JP | 2001-256195 | 9/2001 |
| JP | 2001-297263 | 10/2001 |
| JP | 2002-189609 | 7/2002 |
| JP | 2002-288449 | 10/2002 |
| JP | 2003-058450 | 2/2003 |
| JP | 2003-124921 | 4/2003 |
| JP | 2003-141009 | 5/2003 |
| JP | 2003-248783 | 9/2003 |
| JP | 2003-331141 | 11/2003 |
| JP | 2004-030189 | 1/2004 |

* cited by examiner

*Primary Examiner* — Jivka Rabovianski
*Assistant Examiner* — Vivek Srivastava
(74) *Attorney, Agent, or Firm* — Finnegan, Henderson, Farabow, Garrett & Dunner, L.L.P.

(57) ABSTRACT

In a content supply system, content data is supplied from a content supply apparatus to a content playback apparatus via a network. The content playback apparatus includes a request device for requesting a recovery process; an obtaining device for obtaining a start-up file; and a download device for downloading the content data. The content supply apparatus includes a customer information management device for managing customer information; a notification device for notifying the recovery information to the content playback apparatus; a start-up file generation device for generating a start-up file; a storage device for storing the start-up file; a content data supply device for allowing the content data to be downloaded; and a license data supply device for allowing the license data to be downloaded.

8 Claims, 9 Drawing Sheets

FIG. 3

| USER ID | PASSWORD | NICKNAME (TERMINAL NAME) | BILLING ID | MUSIC KEY NUMBER | CONTENT ID | DL COMPLETION FLAG | NUMBER OF RECOVERIES THAT CAN BE PERFORMED (INITIAL VALUE 0) | NUMBER OF RECOVERIES THAT ARE PERFORMED |
|---|---|---|---|---|---|---|---|---|
| XYZ1234 | 123ABC | NO. X1 MACHINE | 367586938262 | L2345X | ZX00001 | 1 | 0 | 0 |
| | | | | | ZX00002 | 1 | 0 | 0 |
| | | | | | ZX00003 | 0 | 0 | 0 |
| | | | | | ZX00004 | 1 | 0 | 0 |
| | | | 9796854 73265 | B4321S | KJ00037 | 0 | 0 | 0 |
| | | | 3267320 97867 | G5802F | XJ00040 | 1 | 0 | 0 |

FIG. 6

```
<InitFile>
  <request>
    <usageright>
        <SID>070200</SID>
        <URL>http://www.ABC.co.jp/usage</URL>
        <UID>KJ00037</UID>
        <TID>020101010102</TID>
        <bindID>00000001</bindID>
    </usageright>
    <content>
        <CID>KJ00037</CID>
        <URL>http://www.ABC.co.jp/0702000000000001.OMA</URL>
        <LENGTH>5C9710</LENGTH>
    </content>
         .
         .
         .
  </request>
</InitFile>
```

FIG. 7

```
<ListFile>
    <List>
        <ContensID>KJ00037</ContensID>
        <DLFlag>1</DLFlag>
    </List>
    <List>
        <ContensID>XJ00040</ContensID>
        <DLFlag>0</DLFlag>
    </List>
        .
        .
        .
</ListFile>
```

CONTENT SUPPLY SYSTEM, CONTENT SUPPLY APPARATUS AND METHOD, CONTENT PLAYBACK APPARATUS AND METHOD, AND PROGRAM

CROSS REFERENCES TO RELATED APPLICATIONS

The present invention contains subject matter related to Japanese Patent Application JP 2004-149030 filed in the Japanese Patent Office on May 19, 2004, the entire contents of which are incorporated herein by reference.

BACKGROUND OF THE INVENTION

1. Field of the Invention

The present invention relates to a content supply system, a content supply apparatus and method, a content playback apparatus and method, and a program. More particularly, the present invention relates to a content supply system suitable for use with a case in which content data is bought and sold via a network typified by the Internet, a content supply apparatus and method for use therewith, a content playback apparatus and method for use therewith, and a program for use therewith.

2. Description of the Related Art

Hitherto, there has been a known system for downloading content data via a network typified by the Internet by using personal computers, cellular phones, and the like. Also, there is an invention capable of performing a download again when the download of content data fails (see, for example, Japanese Unexamined Patent Application Publication No. 2001-256195).

SUMMARY OF THE INVENTION

However, in the invention of Japanese Unexamined Patent Application Publication No. 2001-256195, when the download of content data fails, the failure of the download is notified to a user so as to prompt the user to instruct the re-execution of a download, and the download is performed in response to the download re-execution being instructed from the user. As a result, there is the problem of taking time and effort for the user.

Another problem is that, hitherto, there does not exist a technology capable of downloading content data again without being billed again, for example, when the download of content data succeeds and thereafter a personal computer having stored therein the downloaded content data fails.

The present invention has been made in view of such circumstances. It is desirable to be capable of downloading content data again without being billed again, for example, when the download of content data succeeds and thereafter a personal computer having stored therein the downloaded content data fails.

According to an embodiment of the present invention, there is provided a content supply system including: a content playback apparatus; and a content supply apparatus, wherein the content playback apparatus includes: request means requesting a recovery process for obtaining again content data that is obtained and erased from the content supply apparatus; obtaining means obtaining, from the content supply apparatus, a start-up file containing a destination where the content data for which the recovery process is to be performed is obtained and a destination where license data corresponding to the content data is obtained, on the basis of recovery information indicating the permission/nonpermission of the recovery process, the recovery information being notified from the content supply apparatus; and download means downloading, based on the start-up file, the content data for which the recovery process is to be performed and license data corresponding to the content data from the content supply apparatus, and wherein the content supply apparatus includes: customer information management means managing customer information containing at least information indicating the permission/nonpermission of the recovery process for the content data that is already purchased, for each user of the content playback apparatus; notification means notifying the recovery information to the content playback apparatus on the basis of the customer information in response to a request of the recovery process from the content playback apparatus; start-up file generation means generating the start-up file in response to a request from the content playback apparatus; storage means storing the start-up file that is generated by the start-up file generation means and that is to be obtained by the content playback apparatus; content data supply means allowing the content data to be downloaded to the content playback apparatus; and license data supply means allowing the license data to be downloaded to the content playback apparatus.

According to another embodiment of the present invention, there is provided a first content supply method including the steps of: requesting a recovery process for obtaining again content data that is obtained and erased from the content supply apparatus; notifying recovery information to the content playback apparatus on the basis of customer information containing at least information indicating the permission/nonpermission of a recovery process for the content data that is already purchased, the information being managed for each user of the content playback apparatus, in response to a request of the recovery process from the content playback apparatus; requesting, from the content supply apparatus, a start-up file containing a destination where the content data for which the recovery process is to be performed is obtained and a destination where license data corresponding to the content data is obtained, on the basis of recovery information notified from the content supply apparatus; generating a start-up file in response to a request from the content playback apparatus; storing the start-up file that is generated in the start-up file generation step and that is to be obtained by the content playback apparatus; and downloading, based on the start-up file obtained from the content supply apparatus, the content data for which the recovery process is to be performed and license data corresponding to the content data.

According to another embodiment of the present invention, there is provided a content supply apparatus including: customer information management means managing, for each user of the content playback apparatus, customer information containing at least information indicating the permission/nonpermission of a recovery process for allowing the content data that is already purchased to be obtained again; notification means notifying, based on the customer information, recovery information indicating the permission/nonpermission of the recovery process in response to a request of the recovery process from the content playback apparatus; start-up file generation means generating the start-up file in response to a request from the content playback apparatus; storage means storing the start-up file that is generated by the start-up file generation means and that is to be obtained by the content playback apparatus; content data supply means allowing the content data to be downloaded in response to a request from the content playback apparatus on the basis of the start-up file; and license data supply means allowing the license data to be downloaded in response to a request from the content playback apparatus on the basis of the start-up file.

According to another embodiment of the present invention, there is provided a second content supply method including the steps of: notifying, to the content playback apparatus, recovery information indicating the permission/nonpermission of a recovery process on the basis of customer information containing at least information indicating the permission/nonpermission of the recovery process for the purchased content data in response to a request, from the content playback apparatus, of the recovery process for obtaining again the content data that is already purchased; generating a start-up file in response to a request from the content playback apparatus; storing the start-up file that is generated in the start-up file generation step and that is to be obtained by the content playback apparatus; allowing the content data to be downloaded in response to a request from the content playback apparatus on the basis of the start-up file; and allowing the license data to be downloaded in response to a request from the content playback apparatus on the basis of the start-up file.

According to another embodiment of the present invention, there is provided a first program for enabling a computer to perform processing including the steps of: notifying, to the content playback apparatus, recovery information indicating the permission/nonpermission of a recovery process on the basis of customer information containing at least information indicating the permission/nonpermission of the recovery process for the purchased content data in response to a request, from the content playback apparatus, of a recovery process for obtaining again the content data that is already purchased, the information being managed for each user of the content playback apparatus; generating a start-up file in response to a request from the content playback apparatus; storing the start-up file that is generated in the start-up file generation step and that is to be obtained by the content playback apparatus; allowing the content data to be downloaded in response to a request from the content playback apparatus on the basis of the start-up file; and allowing the license data to be downloaded in response to a request from the content playback apparatus on the basis of the start-up file.

According to another embodiment of the present invention, there is provided a content playback apparatus including: request means for requesting a recovery process for obtaining again content data that is obtained and erased from the content supply apparatus; obtaining means for obtaining, from the content supply apparatus, a start-up file containing a destination where the content data for which the recovery process is to be performed is obtained and a destination where license data corresponding to the content data is obtained, on the basis of recovery information indicating the permission/nonpermission of the recovery process, the recovery information being notified from the content supply apparatus; and download means for downloading, from the content supply apparatus, the content data for which the recovery process is to be performed and license data corresponding to the content data on the basis of the start-up file.

According to another embodiment of the present invention, there is provided a content playback method including the steps of: requesting a recovery process for obtaining again content data that is obtained and erased from the content supply apparatus; obtaining, from the content supply apparatus, a start-up file containing a destination where the content data for which a recovery process is to be performed is obtained and a destination where license data corresponding to the content data is obtained, on the basis of recovery information indicating the permission/nonpermission of the recovery process, the recovery information being notified from the content supply apparatus; and downloading, from the content supply apparatus, the content data for which the recovery process is to be performed and license data corresponding to the content data on the basis of the start-up file.

According to another embodiment of the present invention, there is provided a second program for enabling a computer to perform processing including the steps of: requesting a recovery process for obtaining again content data that is obtained and erased from the content supply apparatus; obtaining, from the content supply apparatus, a start-up file containing a destination where the content data for which a recovery process is to be performed is obtained and a destination where license data corresponding to the content data is obtained, on the basis of recovery information indicating the permission/nonpermission of the recovery process, the recovery information being notified from the content supply apparatus; and downloading, from the content supply apparatus, the content data for which the recovery process is to be performed and license data corresponding to the content data on the basis of the start-up file.

In the content supply system and method according to the embodiments of the present invention, the content playback apparatus requests a recovery process for obtaining again content data that is obtained and erased from the content supply apparatus. In response to a request of the recovery process from the content playback apparatus, the content supply apparatus notifies the recovery information to the content playback apparatus on the basis of customer information containing at least information indicating the permission/nonpermission of the recovery information for the content data that is purchased, for each user of the content playback apparatus. Based on the recovery information notified from the content supply apparatus, the content playback apparatus requests, from the content supply apparatus, a start-up file containing a destination where the content data for which the recovery process is to be performed is obtained and a destination where license data corresponding to the content data is obtained. In response to this request, the content supply apparatus generates and stores the start-up file. Furthermore, based on the start-up file obtained from the content supply apparatus, the content playback apparatus allows content data for which a recovery process is to be performed and license data corresponding to the content data to be downloaded from the content supply apparatus.

In the content supply apparatus and method, and the program according to the embodiments of the present invention, a recovery process indicating the permission/nonpermission of the recovery process is notified to the content playback apparatus on the basis of the customer information containing at least the information indicating the permission/nonpermission of the recovery process for the purchased content data, the information being managed for each user of the content playback apparatus, in response to a request of the recovery process for obtaining against the purchased content data from the content playback apparatus. A start-up file is generated in response to the request from the content playback apparatus and is stored. Furthermore, in response to the request from the content playback apparatus on the basis of the start-up file, the content data is downloaded or the license data is downloaded.

In the content supply apparatus and method, and the program according to the embodiments of the present invention, based on recovery information indicating the permission/nonpermission of the recovery process, which is notified from the content supply system, a start-up file containing a destination where content data for which a recovery process is to be performed is obtained and a destination where license data corresponding to the content data is obtained is obtained from the content supply system. Based on the start-up file, the content data for which a recovery process is to be performed and the license data corresponding to the content data are downloaded from the content supply system.

According to the embodiments of the present invention, for example, when the download of content data succeeds and thereafter a personal computer having stored therein the downloaded content data fails, the content data can be downloaded again without being billed again.

BRIEF DESCRIPTION OF THE DRAWINGS

FIG. 3 shows an example of customer information managed by a customer information management section of FIG. 1;

FIG. 6 shows an example of a start-up file written using XML;

FIG. 7 shows an example of a musical-piece list file written using XML;

DESCRIPTION OF THE PREFERRED EMBODIMENTS

Embodiments of the present invention will now be described below. The corresponding relationship between the constituent features of the claims and the specific examples in the embodiments of the present invention is described below as an example. This description is to confirm that the specific examples supporting the invention described in the claims are described in the embodiments of the present invention. Therefore, even if there are specific examples that are not described here as those corresponding to the constituent features although described in the embodiments of the invention, that fact does not mean that the specific examples do not correspond to the constituent features. Conversely, even if the specific examples are described here as those corresponding to the constituent features, that fact does not mean that the specific examples do not correspond to constituent features other than those constituent features.

Furthermore, this description does not mean that all the inventions corresponding to the specific examples described in the embodiments of the present invention are described in the claims. In other words, this description is on the invention corresponding to the specific examples described in the embodiments of the invention, and does not deny the existence of the invention that is not described in the claims of this application, that is, the existence of the invention for which a divisional application will be filed or which will be added by amendments in the future.

Figure 1:
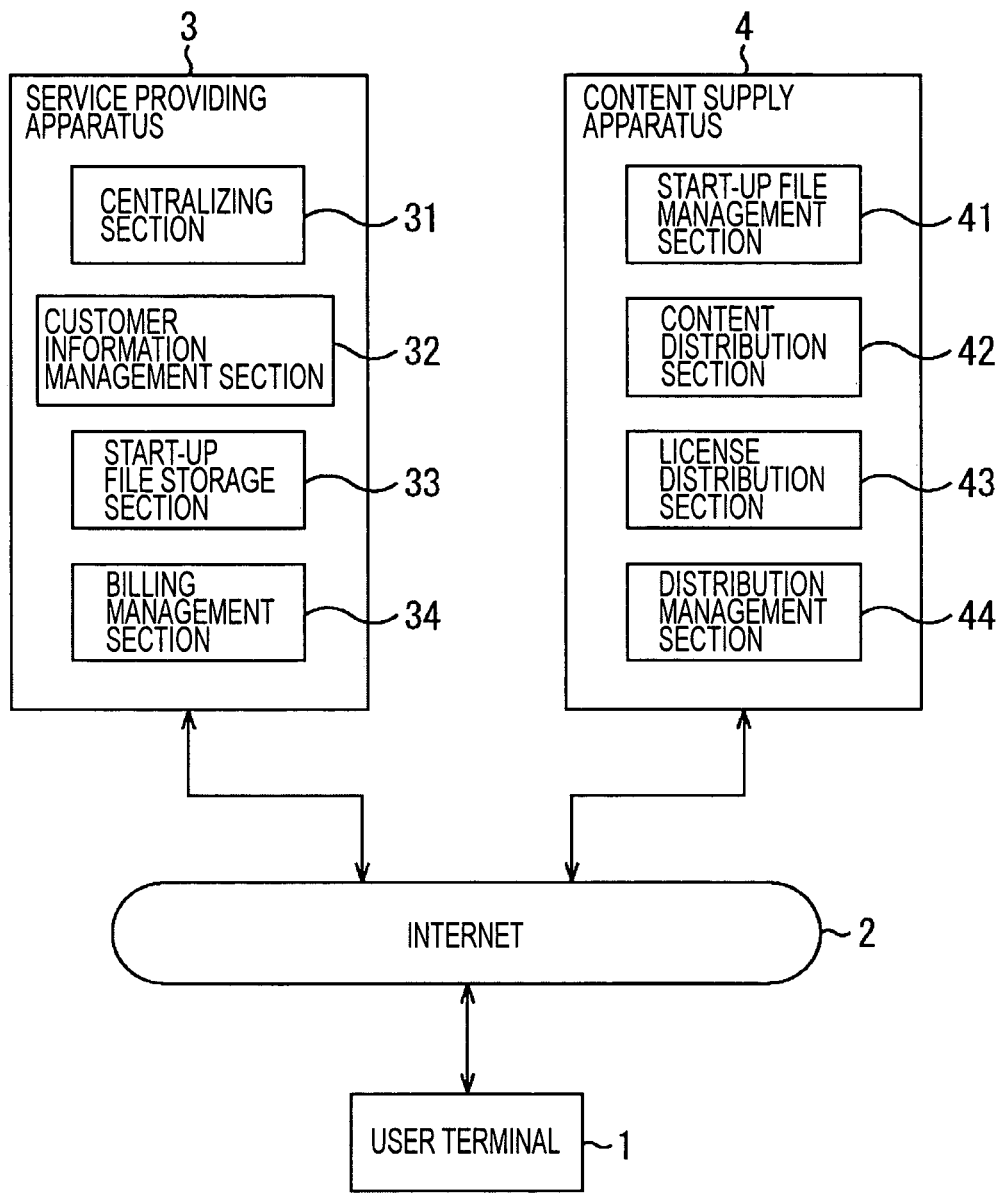
FIG. 1 is a block diagram showing an example of the configuration of a content supply system to which the present invention is applied.

In the content supply system (for example, a content supply system shown in FIG. 1) according to the embodiment of the present invention, the content playback apparatus (for example, a user terminal 1 of FIG. 1) includes:

request means (for example, a communication section 58 of FIG. 2) for requesting a recovery process for obtaining again content data that is obtained and erased from the content supply apparatus;

obtaining means (for example, a start-up file obtaining section 55 of FIG. 2) for obtaining, from the content supply apparatus, a start-up file containing a destination where the content data for which a recovery process is to be performed is obtained and a destination where license data corresponding to the content data is obtained, on the basis of recovery information indicating the permission/nonpermission of the recovery process, the recovery information being notified from the content supply apparatus; and download means (for example, a content/license obtaining section 56) for downloading, based on the start-up file, the content data for which a recovery process is to be performed and license data corresponding to the content data from the content supply apparatus, and the content supply apparatus (for example, a service providing apparatus 3 and a content supply apparatus 4 of FIG. 1) includes:

customer information management means (for example, a customer information management section 32 of FIG. 1) for managing customer containing at least information indicating the permission/nonpermission of the recovery process for the content data that is purchased, for each user of the content playback apparatus;

notification means (for example, a centralizing section 31 of FIG. 1) for notifying the recovery information to the content playback apparatus on the basis of the customer information in response to a request of the recovery process from the content playback apparatus;

start-up file generation means (for example, a start-up file management section 41 of FIG. 1) for generating the start-up file in response to a request from the content playback apparatus;

storage means (for example, a start-up file storage section 33 of FIG. 1) for storing the start-up file that is generated by the start-up file generation means and that is to be obtained by the content playback apparatus;

content data supply means (for example, a content distribution section 42 of FIG. 1) for allowing the content data to be downloaded to the content playback apparatus; and license data supply means (for example, a license distribution section 43 of FIG. 1) for allowing the license data to be downloaded to the content playback apparatus.

The content supply method according to the embodiment of the present invention includes the steps of:

requesting (for example, step S72 of FIG. 8) a recovery process for obtaining again content data that is obtained and erased from the content supply apparatus;

notifying (for example, step S82 of FIG. 8) recovery information to the content playback apparatus on the basis of customer information containing at least information indicating the permission/nonpermission of a recovery process for the content data that is already purchased, the information being managed for each user of the content playback apparatus, in response to a request of the recovery process from the content playback apparatus;

requesting (for example, step S73 of FIG. 8), from the content supply apparatus, a start-up file containing a destination where the content data for which the recovery process is to be performed is obtained and a destination where license data corresponding to the content data is obtained, on the basis of recovery information notified from the content supply apparatus;

generating (for example, step S91 of FIG. 8) a start-up file in response to a request from the content playback apparatus;

storing (for example, step S84 of FIG. 8) the start-up file that is generated in the start-up file generation step and that is to be obtained by the content playback apparatus; and downloading (for example, step S74 of FIG. 8), from the content supply apparatus, the content data for which the recovery process is to be performed and license data corresponding to the content data on the basis of the start-up file obtained from the content supply apparatus.

The content supply apparatus (for example, the service providing apparatus 3 and the content supply apparatus 4 of FIG. 1) according to the embodiment of the present invention includes:

customer information management means (for example, a customer information management section 32 of FIG. 1) managing, for each user of the content playback apparatus, customer information containing at least information indicating the permission/nonpermission of a recovery process for allowing the content data that is already purchased to be obtained again;

notification means (for example, a communication section 58 of FIG. 2) notifying, based on the customer information, recovery information indicating the permission/nonpermission of the recovery process in response to a request of the recovery process from the content playback apparatus;

start-up file generation means (for example, a start-up file management section 41 of FIG. 1) generating the start-up file in response to a request from the content playback apparatus;

storage means (for example, a start-up file storage section 33 of FIG. 1) storing the start-up file that is generated by the start-up file generation means and that is to be obtained by the content playback apparatus;

content data supply means (for example, a content distribution section 42 of FIG. 1) allowing the content data to be downloaded in response to a request from the content playback apparatus on the basis of the start-up file; and license data supply means (for example, a license distribution section 43 of FIG. 1) allowing the license data to be downloaded in response to a request from the content playback apparatus on the basis of the start-up file.

The content supply method according to the embodiment of the present invention includes the steps of:

notifying (for example, step S82 of FIG. 8), to the content playback apparatus, recovery information indicating the permission/nonpermission of the recovery process on the basis of customer information containing at least information indicating the permission/nonpermission of a recovery process for the purchased content data in response to a request, from the content playback apparatus, of the recovery process for obtaining again the content data that is already purchased;

generating (for example, step S91 of FIG. 8) a start-up file in response to a request from the content playback apparatus;

storing (for example, step S84 of FIG. 8) the start-up file that is generated in the start-up file generation step and that is to be obtained by the content playback apparatus;

allowing (for example, step S93 of FIG. 8) the content data to be downloaded in response to a request from the content playback apparatus on the basis of the start-up file; and allowing (for example, step S94 of FIG. 8) the license data to be downloaded in response to a request from the content playback apparatus on the basis of the start-up file.

The content playback apparatus (for example, the user terminal 1 of FIG. 1) according to the embodiment of the present invention includes:

request means (for example, a communication section 58 of FIG. 2) requesting a recovery process for obtaining again content data that is obtained and erased from the content supply apparatus;

obtaining means (for example, a start-up file obtaining section 55 of FIG. 2) obtaining, from the content supply apparatus, a start-up file containing a destination where the content data for which the recovery process is to be performed is obtained and a destination where license data corresponding to the content data is obtained, on the basis of recovery information indicating the permission/nonpermission of the recovery process, the recovery information being notified from the content supply apparatus; and download means (for example, a content/license obtaining section 56 of FIG. 2) downloading, from the content supply apparatus, the content data for which the recovery process is to be performed and license data corresponding to the content data on the basis of the start-up file.

The content playback method according to the embodiment of the present invention includes the steps of:

requesting (for example, step S72 of FIG. 8) a recovery process for obtaining again content data that is obtained and erased from the content supply apparatus;

obtaining (for example, step S85 of FIG. 8), from the content supply apparatus, a start-up file containing a destination where the content data for which a recovery process is to be performed is obtained and a destination where license data corresponding to the content data is obtained, on the basis of recovery information indicating the permission/nonpermission of the recovery process, the recovery information being notified from the content supply apparatus; and downloading (for example, step S93 of FIG. 8), from the content supply apparatus, the content data for which the recovery process is to be performed and license data corresponding to the content data on the basis of the start-up file.

The corresponding relationship between the constituent features of the programs according to the embodiments of the present invention and the specific examples of the embodiments of the present invention is identical to those of the content distribution method and the content playback method described above of the present invention. Thus, the descriptions thereof are omitted.

Specific embodiments of the present invention will now be described in detail with reference to the drawings.

FIG. 1 shows an example of the configuration of a content supply system according to an embodiment of the present invention. The content supply system is an electrical appliance for an ordinary household and includes a user terminal 1 for playing back content data (for example, audio data from which a musical piece is played back, this may be video data from which a video image is played back, program data by which a predetermined process is performed, etc.), a service providing apparatus 3, provided as a server in the Internet 2, for providing services of supplying content (hereinafter described as "content supply") to a user of the user terminal 1, and a content supply apparatus 4 for supplying content data and license data necessary for playing back the content data to the user terminal 1.

The user terminal 1 is connected to the service providing apparatus 3 via the Internet 2 and communicates various kinds of information (information for authenticating a user, information for billing, etc.) for receiving content distribution services. Furthermore, the user terminal 1 is connected to the content supply apparatus 4 via the Internet 2 and downloads content data and license data corresponding thereto. The user terminal 1 stores the downloaded content data and license data, and reads and plays back the stored content data. The user terminal 1 can also browse home pages set up in an arbitrary server in the Internet 2 and can transmit and receive electronic mail. The user terminal 1 may receive and play a radio broadcast and a television broadcast, and may play back content data recorded on a recording medium, such as a DVD (Digital Versatile Disc), a CD (Compact Disc), and an MD (Mini Disc).

In the service providing apparatus 3, a centralizing section 31 accepts access from the user terminal 1 via the Internet 2 and transmits, to the user terminal 1, HTML (Hyper Text Markup Language) data for displaying a home page from which content data can be purchased. The centralizing section 31 controls each section of the service providing apparatus 3 in response to a request from the user terminal 1 and also requests each section of the content supply apparatus 4 to perform a predetermined operation. Also, the centralizing section 31 supplies a start-up file (to be described in detail with reference to FIG. 6) generated by a start-up file management section 41 of the content supply apparatus 4 to the user terminal 1. This start-up file contains information indicating a destination where content data purchased (downloaded by the user terminal 1) by the user of the user terminal 1 is downloaded and a destination where license data corresponding to the content data is downloaded.

Furthermore, based on the customer information managed by the customer information management section 32, the centralizing section 31 generates a musical-piece list file (to be described in detail with reference to FIG. 7), which is a list of content data, purchased (downloaded by the user terminal 1) by the user of the user terminal 1, and supplies the musical-piece list file to the user terminal 1. The musical-piece list file contains content identification information for specifying content data and information indicating whether or not the content data and the license data corresponding thereto are downloaded normally.

The customer information management section 32 holds information (hereinafter described as "customer information", and the details will be described later with reference to FIG. 3) about the user (the customer of the content supply system) of the user terminal 1, and updates the information. Also, the customer information management section 32 holds the history information (license download log) of the download of the license data with respect to the user terminal 1. The start-up file storage section 33, under the control of the centralizing section 31, stores a start-up file generated by the start-up file management section 41 and deletes the stored start-up file in response to a request from the centralizing section 31. A billing management section 34 manages, for example, the billing money for the user (the customer of the content supply system) of the user terminal 1.

In the content supply apparatus 4, in response to a request from the centralizing section 31, the start-up file management section 41 generates a start-up file to be purchased and for recovery. In response to a request from the user terminal 1, the content distribution section 42 distributes (downloads) content data via the Internet 2. In response to a request from the user terminal 1, the content distribution section 42 distributes (downloads) license data via the Internet 2. A distribution management section 44 notifies the finalized sales of the content data to the customer information management section 32. Also, the distribution management section 44 notifies the distribution completion of the content data and the license data to the customer information management section 32.

Figure 2:
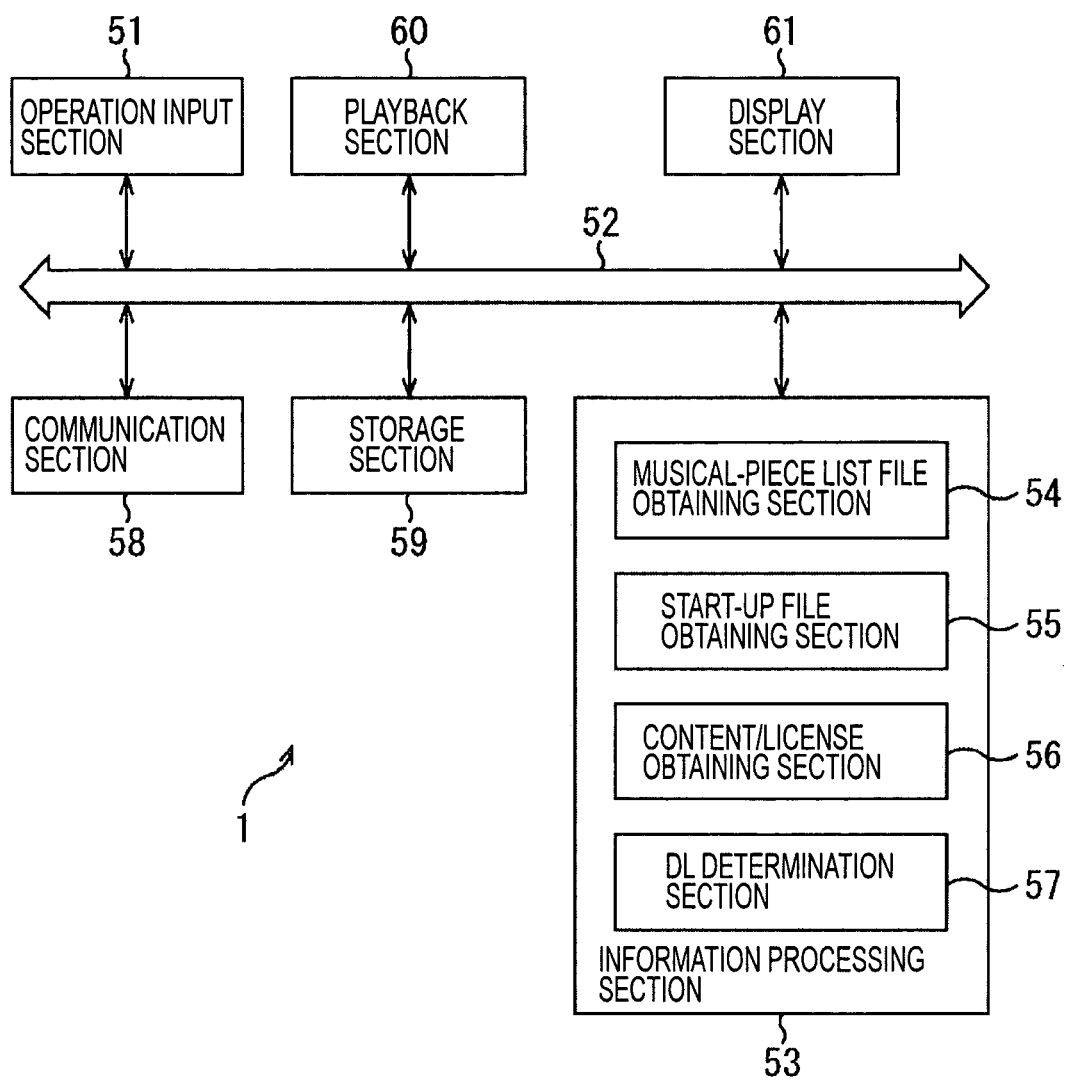
FIG. 2 is a block diagram showing an example of the configuration of a user terminal of FIG. 1.

FIG. 2 shows an example of the configuration of the user terminal 1. An operation input section 51 generates a control signal on the basis of an operation of the user and supplies the generated control signal to a corresponding part of the user terminal 1 via a bus line 52. An information processing section 53 processes HTML data obtained by the communication section 58 and outputs a video signal obtained thereby to a display section 61. Also, the information processing section 53 performs processing associated with the obtainment of the content data and the license data by using an incorporated musical-piece list file obtaining section 54, a start-up file obtaining section 55, a content/license obtaining section 56, and a download (DL) determination section 57.

The musical-piece list file obtaining section 54 obtains and holds a musical-piece list file from the centralizing section 31 of the service providing apparatus 3 via the bus line 52 and the communication section 58. The start-up file obtaining section 55 obtains and holds a start-up file from the centralizing section 31 of the service providing apparatus 3 via the bus line 52 and the communication section 58. Based on the start-up file held by the start-up file obtaining section 55, the content/license obtaining section 56 obtains content data from the content distribution section 42 of the content supply apparatus 4 and obtains license data from the license distribution section 43, via the bus line 52 and the communication section 58. The download determination section 57 determines whether or not the download of the content data by the content/license obtaining section 56 is completed normally.

The communication section 58 is connected to the service providing apparatus 3, the content supply apparatus 4, or an arbitrary server via the Internet 2, and communicates various kinds of data. For example, based on a content purchase operation of the user, which is input to the operation input section 51, the information of content purchase is communicated to the centralizing section 31 of the service providing apparatus 3 via the Internet 2.

A storage section 59 stores the content data and the license data obtained by the content/license obtaining section 56. The playback section 60 reads and plays back content data stored in the storage section 59, and outputs the audio data obtained thereby from a speaker (not shown), in accordance with a control signal from the operation input section 51 on the basis of the operation of the user. The display section 61 displays a home page for purchasing content in accordance with a video signal input from the information processing section 53.

FIG. 3 shows an example of customer information managed by the customer information management section 32 of the service providing apparatus 3. In the customer information, a user ID, a password, a nickname, a billing ID, a music key number, a content ID, a download (DL) completion flag, a number of recoveries that can be performed, and a number of recoveries that are performed are managed so as to correspond to one another.

The user ID is identification information for uniquely identifying the user of the user terminal 1. The password is information that can be known by the user himself/herself for the purpose of certifying that the operation is an operation by the user himself/herself. The nickname is a name provided to the user terminal 1 by the user. However, since providing a plurality of nicknames to the same user terminal 1 is not permitted, for example, when one user terminal 1 is shared among a family (plural users) in an ordinary household, there can be cases in which a plurality of user IDs correspond to one nickname.

The billing ID is information for specifying settlement completion information generated when the user purchases a package, which is a purchase unit of content data. The package, which is the purchase unit, may be formed of content data of one piece of music and may also be formed of a plurality of musical pieces like an album. For example, when a package of an album formed of a plurality of pieces of content data is purchased, the same billing ID corresponds to the plurality of pieces of content data forming the album.

The music key number is information having a one-to-one correspondence with the billing ID, and is information notified to the user through electronic mail when the user purchases a package, which is a purchase unit of content data, and the settlement is completed.

The content ID is information for identifying content data purchased by the user. For example, when a package of an album formed of content data of 10 pieces of music is purchased, 10 content IDs are additionally written correspondingly to one billing ID.

The download completion flag is information that corresponds to the content ID, and is a flag indicating whether or not the download of the content data corresponding to the content ID and the license data corresponding to the content data is completed normally. When the download completion flag is 0, this means that the download is completed normally. When the download completion flag is 1, this means that the download is not completed normally.

The number of recoveries that can be performed is information that corresponds to the content ID. The number of recoveries that can be performed is information, whose initial value is 0, indicating the number of times in which the content data and the license data are downloaded without purchasing the content data again (hereinafter described as a "recovery") when the download of the content data corresponding to the content ID and the license data corresponding to the content data is completed normally, and thereafter the downloaded content data and license data are erased due to, for example, the failure of the user terminal 1. For the number of recoveries that can be performed, the number of recoveries that can be performed, which corresponds to the content ID of all the content data purchased by the user, is incremented by 1 by the operator of the service providing apparatus 3 when a request for a recovery is made from the user side.

The number of recoveries that are performed, whose initial value is 0, is information that corresponds to the content ID, and is information indicating the number of times in which the recovery of the content data and the license data corresponding to the content ID has been performed. The number of recoveries that are performed is incremented by 1 only when a recovery is performed and succeeds.

The number of recoveries that can be performed and the number of recoveries that are performed are only incremented and are not decremented. Therefore, when the number of recoveries that can be performed and the number of recoveries that are performed are equal, the recovery is not permitted. On the contrary, when the number of recoveries that can be performed is greater by 1 than the number of recoveries that are performed, a recovery is permitted. It is possible for the operator of the service providing apparatus 3 to know the number of times in which recoveries were performed in the past by viewing the number of recoveries that are performed.

Figure 4:
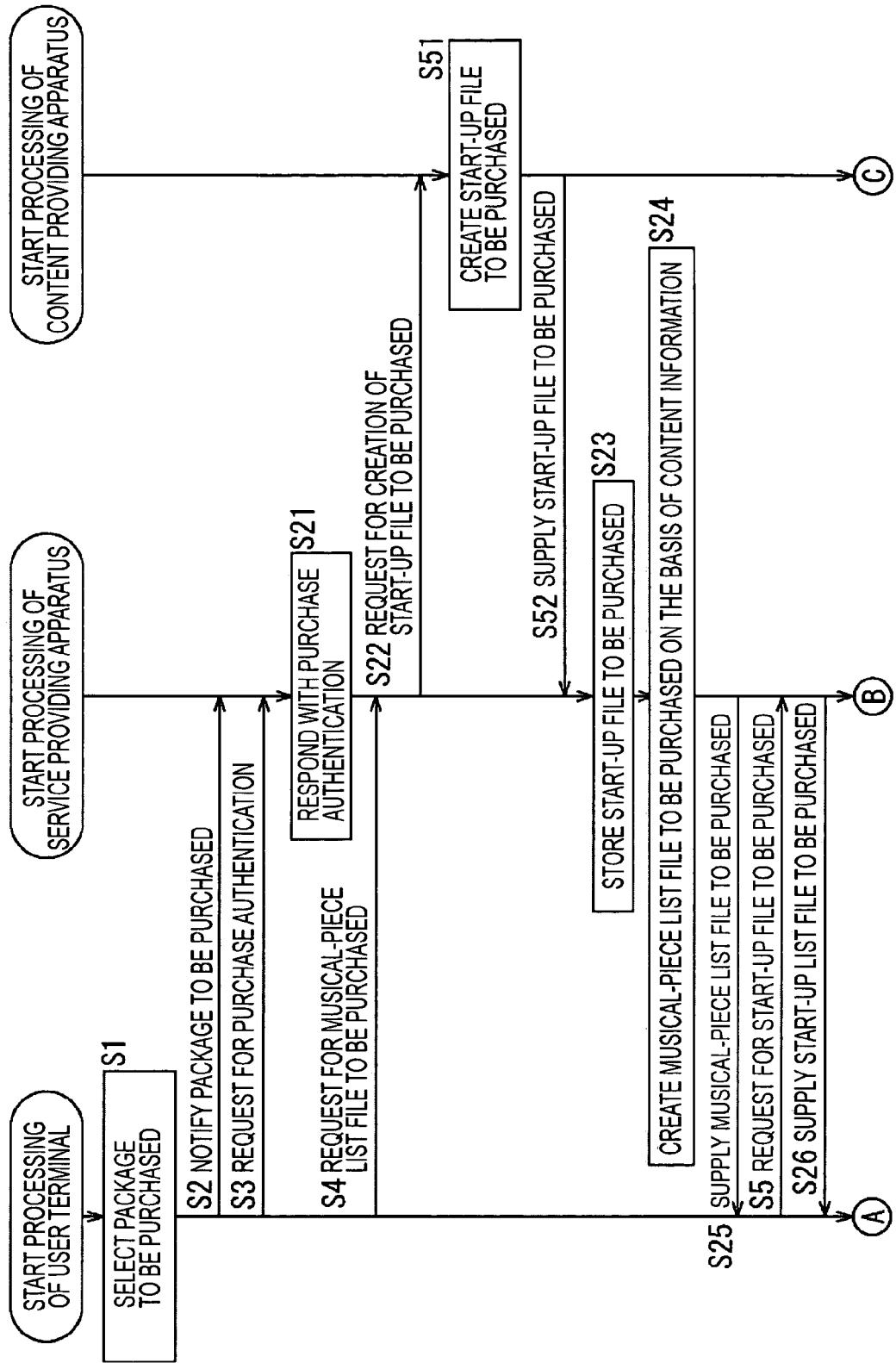
FIG. 4 is a flowchart illustrating an operation when content data is purchased.
Figure 5:
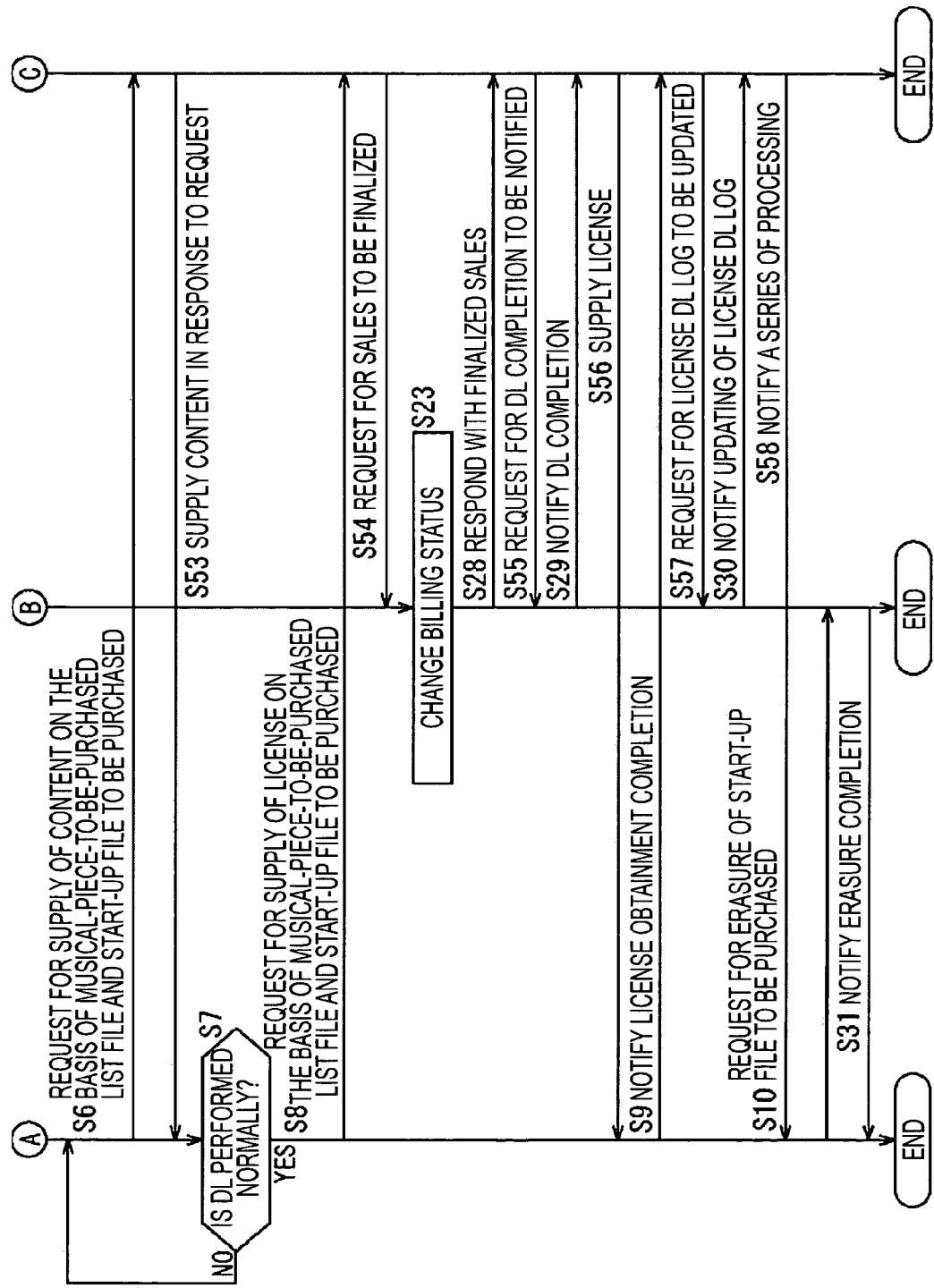
FIG. 5 is a flowchart illustrating an operation when content data is purchased.

Next, a description is given, with reference to the flowcharts in FIGS. 4 and 5, of the operation of the content supply system when the user of the user terminal 1 purchases content. It is assumed that the user of the user terminal 1 is a customer of the content supply services and that the user ID and the credit number for billing have already been registered.

In step S1, the user terminal 1 accesses the home page for purchasing content, set up by the service providing apparatus 3, in accordance with the operation of the user, and selects content to be purchased. More specifically, the user inputs an operation for accessing the home page for purchasing content to the operation input section 51. Based on this operation, the operation input section 51 outputs a corresponding control signal to the communication section 58. Based on the control signal from the operation input section 51, the communication section 58 accesses the service providing apparatus 3 via the Internet 2 and requests HTML data of the home page for purchasing content. In response to this request, the centralizing section 31 of the service providing apparatus 3 sends back the corresponding HTML data to the user terminal 1 via the Internet 2. The communication section 58 receiving this data outputs the received HTML data to the information processing section 53. The information processing section 53 generates a video signal corresponding to the input HTML data and outputs it to the playback section 60. The playback section 60 displays the input video signal. On the displayed home page for purchasing content, the user selects content to be purchased in units of packages, and also inputs its own user ID, password, etc.

In step S2, the communication section 58 of the user terminal 1 notifies the package to be purchased to the service providing apparatus 3 via the Internet 2. In response, the service providing apparatus 3 notifies the content ID of the content data forming the package to be purchased to the user terminal 1.

In step S3, the communication section 58 of the user terminal 1 notifies the user ID, the password, the nickname, and the content ID of the content data forming the package to be purchased to the service providing apparatus 3 via the Internet 2 in order to request a purchase authentication.

In response to this request, in step S21, the centralizing section 31 of the service providing apparatus 3 notifies the user ID, the password, the nickname, and the content ID of the content data forming the package to be purchased, which are notified, to the customer information management section 32 in order to confirm that the user who has requested the purchase of the content is a registered customer. The customer information management section 32 additionally writes the content ID of the content data forming the notified package to be purchased to the customer information. At this time, the download completion flag corresponding to each content ID is recorded as 0 (download incompletion).

In step S4, the musical-piece list file obtaining section 54 of the user terminal 1 notifies a request for obtaining a musical-piece-to-be-purchased list file, as well as the content ID of the content data forming the package to be purchased, to the service providing apparatus 3 via the communication section 58 and the Internet 2.

In response to this notification, in step S22, the centralizing section 31 of the service providing apparatus 3 notifies the content ID of the content data purchased by the user to the content supply apparatus 4 via the Internet 2, and requests the content supply apparatus 4 to create a start-up file to be purchased via the Internet 2. In response to this request, the start-up file management section 41 of the content supply apparatus 4 creates the start-up file to be purchased in step S51.

The start-up file to be purchased is information used when the purchased content data and the license corresponding thereto are downloaded by the user terminal 1, and is written, for example, using XML (extensible markup language), as shown in FIG. 6.

In the start-up file to be purchased, the information, which is contained by the number of pieces of the content data forming the package to be purchased, is formed of the content ID (CID of FIG. 6) of one or more pieces of content data forming the package to be purchased, the URL (Uniform Resource Locator) of the access destination (i.e., the content distribution section 42 of the content supply apparatus 4) where the content data is downloaded, a data length (LENGTH of FIG. 6) of the content data, specific information (SID of FIG. 6) for specifying license data necessary for playing back the content data, and the URL of the access destination (i.e., the license distribution section 43 of the content supply apparatus 4) where the license data is downloaded.

Referring back to FIG. 4, in step S52, the start-up file management section 41 of the content supply apparatus 4 supplies the generated start-up file to be purchased to the centralizing section 31 via the Internet 2. In step S23, the centralizing section 31 outputs the supplied start-up file to be purchased together with the user ID to the start-up file storage section 33 so as to request that the start-up file and the user ID be stored. In response to this request, the start-up file storage section 33 stores the start-up file to be purchased in such a manner as to correspond to the user ID.

In step S24, the centralizing section 31 notifies the user ID to the customer information management section 32 so that the customer information management section 32 notifies the download status of the content data forming the package to be purchased by the user (i.e., the status of the download completion flag, hereinafter referred to as "content information"). In response to this request, the customer information management section 32 notifies the content information to the centralizing section 31. The centralizing section 31 generates a musical-piece-to-be-purchased list file on the basis of the content information notified from the customer information management section 32.

The musical-piece-to-be-purchased list file is information used when the user terminal 1 downloads the purchased content data and the license corresponding thereto, and is, for example, written using XML, as shown in FIG. 7.

In the musical-piece-to-be-purchased list file, the content ID (Contents ID of FIG. 7) of all the content data forming the package to be purchased and a flag indicating whether or not the content data has been downloaded (DLFlag of FIG. 7, 0 indicates download completion, and 1 indicates download incompletion) are contained.

Referring back to FIG. 4, in step S25, the centralizing section 31 supplies the musical-piece-to-be-purchased list file generated in step S24 to the user terminal 1 via the Internet 2. The supplied musical-piece-to-be-purchased list file is stored in the musical-piece list file obtaining section 54.

In step S5, the start-up file obtaining section 55 of the user terminal 1 notifies a request for obtaining a start-up file to be purchased together with the identification information of the package to be purchased to the service providing apparatus 3 via the communication section 58 and the Internet 2.

In response to this notification, in step S26, the centralizing section 31 of the service providing apparatus 3 supplies the start-up file to be purchased, which is created by the content supply apparatus 4 and which is stored in the start-up file storage section 33, to the user terminal 1 via the Internet 2.

The supplied start-up file to be purchased is stored in the start-up file obtaining section 55.

Referring to the flowchart in FIG. 5, in step S6, the content/license obtaining section 56 of the user terminal 1 accesses the URL (i.e., the content distribution section 42 of the content supply apparatus 4) at which the content data written in the start-up file to be purchased is downloaded and requests the obtainment of the content data whose content ID is written in the musical-piece-to-be-purchased list file and for which the download has not been completed. In response to this request, in step S53, the content distribution section 42 of the content supply apparatus 4 supplies (downloads) the requested content data to the user terminal 1 via the Internet 2. The downloaded content data is stored in the storage section 59 of the user terminal 1.

In step S7, the download determination section 57 of the user terminal 1 determines whether or not the content data requested in step S6 has been downloaded normally. When it is determined in step S6 that the content data requested in step S6 has not been downloaded normally, the process returns to step S6, and processing of step S6 and subsequent steps is repeated.

When it is determined in step S7 that the content data requested in step S6 has been downloaded normally, the process proceeds to step S8. In step S8, the content/license obtaining section 56 of the user terminal 1 accesses the URL (i.e., the license distribution section 43 of the content supply apparatus 4) at which the license data written in the start-up file to be purchased is downloaded, and requests the obtainment of the license data whose content ID is written in the musical-piece-to-be-purchased list file and for which the download has not been completed.

In response to this request, in step S54, the license distribution section 43 of the content supply apparatus 4 requests the finalized sales (the finalization of billing for the user) to the distribution management section 44. In response to this request, the distribution management section 44 issues a billing ID and a music key number corresponding thereto and requests, together with the billing ID and the music key number, the customer information management section 32 of the service providing apparatus 3 to finalize the sales via the Internet 2.

In response to this request, in step S27, the customer information management section 32 notifies the billing ID to the billing management section 34 in order to change the billing status of the user. In response to this request, the billing management section 34 changes the billing status of the user. At this stage, the billing for the user is finalized.

In step S28, the customer information management section 32 notifies the fact that the sales are finalized to the distribution management section 44 of the content supply apparatus 4 via the Internet 2. In response to this notification, in step S55, the distribution management section 44 requests the download completion notification (the download completion flag of the customer information is rewritten, and this is notified) to the customer information management section 32 via the Internet 2. In response to this request, in step S29, the customer information management section 32 rewrites the corresponding download completion flag among the customer information that is managed to 1 and thereafter responds with the download completion notification to the distribution management section 44 via the Internet 2.

In response to this response, in step S56, the distribution management section 44 notifies the fact that the sales are finalized to the license distribution section 43. In response to this notification, the license distribution section 43 supplies (downloads) the license data requested in step S6 to the user terminal 1 via the Internet 2. The downloaded license data is stored in the storage section 59 of the user terminal 1.

In step S9, the content/license obtaining section 56 of the user terminal 1 notifies the license data obtainment completion to the license distribution section 43 of the content supply apparatus 4 via the communication section 58 and the Internet 2. In response to this notification, in step S57, the license distribution section 43 notifies the license data obtainment completion to the distribution management section 44. The distribution management section 44 requests the customer information management section 32 to the update the license download log via the Internet 2. In response to this request, in step S30, the customer information management section 32 updates the license download log and thereafter notifies the fact that the license download log is updated to the distribution management section 44 of the content supply apparatus 4 via the Internet 2. In response to this notification, the distribution management section 44 makes a response with respect to the notification of the license data obtainment completion to the license distribution section 43.

In response to this response, in step S58, the license distribution section 43 notifies the completion of the series of processes of downloading the content data and the license data to the user terminal 1 via the Internet 2. In response to this notification, in step S10, the start-up file obtaining section 55 of the user terminal 1 requests, via the Internet 2, the centralizing section 31 of the service providing apparatus 3 that the start-up file to be purchased, which is stored in the service providing apparatus 3, be deleted. In response to this request, in step S31, the start-up file storage section 33 deletes the stored start-up file to be purchased under the control of the centralizing section 31. The centralizing section 31 notifies the fact that the stored start-up file to be purchased is deleted to the user terminal 1 via the Internet 2.

This completes the operation of the content supply system when the user of the user terminal 1 purchases content.

At the stage where the series of operations is completed, the content supply service provider transmits, to the user of the user terminal 1, electronic mail in which information (the content ID of the content data, etc.) for specifying the purchased package, the purchase year, month, and day, the nickname, the payment method, the money, the billing ID, the music key number, etc., are written. The electronic mail can be received by the user terminal 1, and can also be received using another personal computer, etc. However, in particular, the music key number among the information written in the electronic mail is important information used for a recovery process (to be described later). Therefore, it is preferable that the music key number be stored in, for example, a personal computer other than the user terminal 1.

If the above-described operation is stopped due to some cause such as the failure of the user terminal 1 or the communication trouble of the Internet 2, the processing of step S1 and subsequent steps is performed again. However, in that case, the process of step S22, the process of step S51, and the process of step S52, that is, processing in which a request for creating a start-up file to be purchased is made from the service providing apparatus 3 to the content supply apparatus 4, and the content supply apparatus 4 creates the start-up file to be purchased and supplies it to the service providing apparatus 3, is omitted. The start-up file to be purchased that has been created up to the previous time and that is stored in the start-up file storage section 33 is read and is reused.

Therefore, when the processing of step S1 and subsequent steps is to be performed, the processing time can be shortened by the amount of time necessary for the process of step S22, the process of step S51, and the process of step S52.

Furthermore, the musical-piece-to-be-purchased list file is not reused unlike the start-up file to be purchased and is created each time the processing of step S1 and subsequent steps is performed. Therefore, with respect to the content data whose download has been completed before the above-described operation is stopped, the musical-piece-to-be-purchased list file is created with this fact being reflected. More specifically, since a musical-piece-to-be-purchased list file in which the download completion flag is 1 is created with respect to the content data whose download has been completed, a useless operation of requesting the supply of downloaded content data can be prevented.

Next, a description is given of the recovery process of the user terminal 1. The recovery process refers to processing in which, when the purchased (downloaded) content data and license data are lost due to, for example, the failure of the user terminal 1, all the purchased content data and the license data are provided again. The recovery process can be performed on a user terminal (may be a user terminal that is repaired although a download was performed in the past, but all the data is lost due to a failure and, for example, may be a user terminal that is newly purchased by the user) possessed by the user who purchased the content data.

Figure 8:
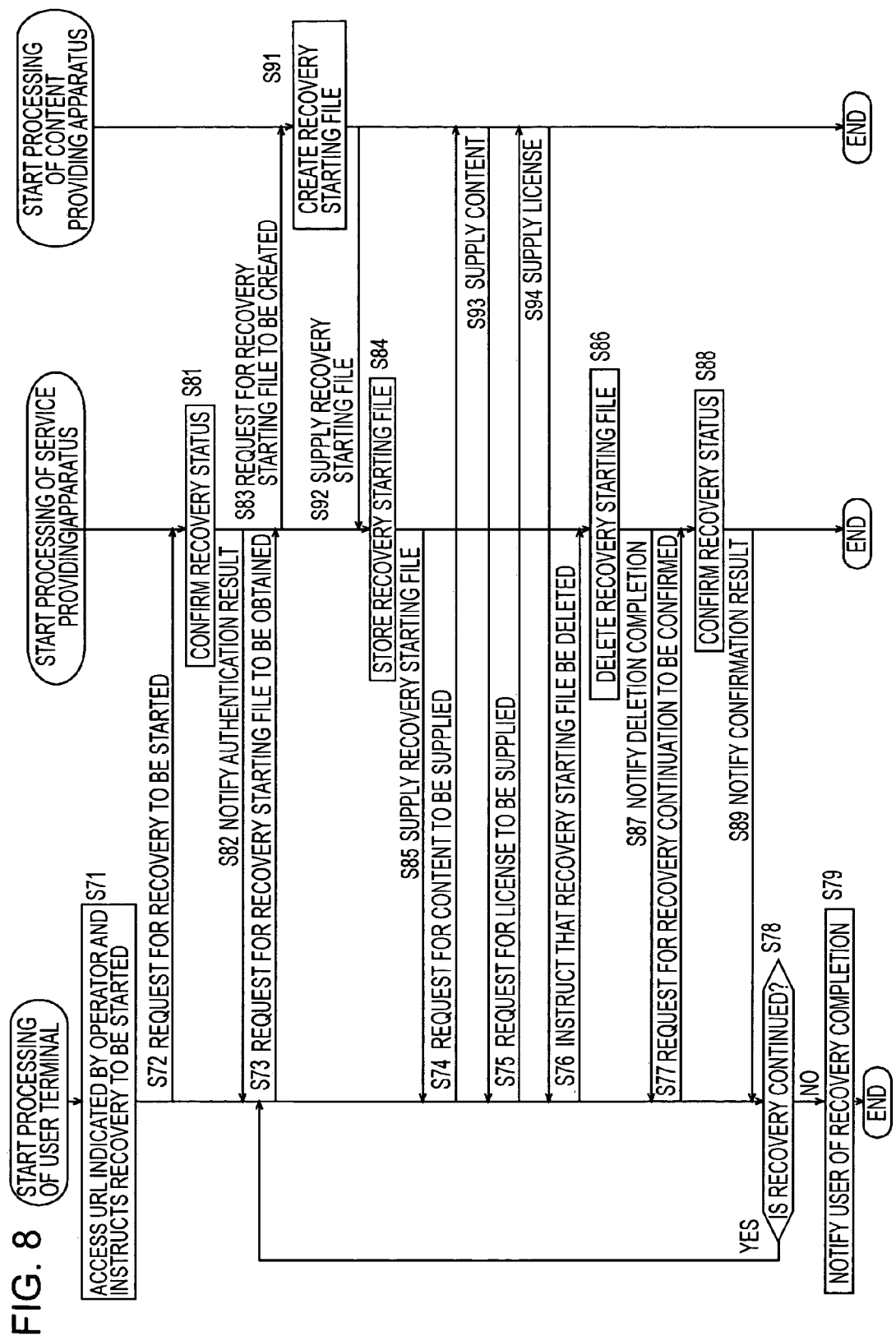
FIG. 8 is a flowchart illustrating a recovery process.

The operation of the recovery process of the content supply system is described with reference to the flowchart in FIG. 8.

For the preparation of this recovery process, it is necessary for the user to request the service provider to enable a recovery process to be performed at the stage where the failure of the user terminal 1 is detected and the necessity of the recovery process is recognized. For this request, information, such as the user ID of the user, the nickname, the electronic mail address, the music key number, etc., by which the identity of the user himself/herself can be confirmed, is notified using a telephone, electronic mail, etc. When the operator on the service provider side can confirm that this request is from the user himself/herself, all the numbers of the recoveries that can be performed, which are managed by the customer information management section 32 of the service providing apparatus 3 and which are contained in the customer information of that user, is incremented by 1. Also, the URL (more specifically, for example, the predetermined URL of the centralizing section 31 of the service providing apparatus 3) of the home page dedicated to that user, at which the starting of the recovery process can be instructed, is notified to the user.

It is assumed that, on this home page dedicated to the user, a "recovery start button", which is displayed only in the state (the state in which the content ID such that the number of recoveries that can be performed of the customer information is greater than the number of recoveries that are performed exists) in which the recovery process is permitted for the user is provided.

In step S71, based on the operation of the user, the user terminal 1 accesses the URL notified from the operator on the service provider side and displays the home page dedicated to that user, which is set up at the URL. In response to the "recovery start button" displayed on the home page being clicked by the user, in step S72, the user terminal 1 requests the centralizing section 31 of the service providing apparatus 3 to start the recovery via the Internet 2.

In response to this request, in step S81, the centralizing section 31 confirms the recovery state of the user with respect to the customer information management section 32. More specifically, of the customer information of the user, which is managed in the customer information management section 32, the content ID, the billing ID, the music key number, etc., of the content data in a state in which a recovery is permitted (i.e., a state in which the number of recoveries that can be performed is greater by 1 than the number of recoveries that are performed) are confirmed. In step S82, the centralizing section 31 notifies the confirmation result in the process of step S81 to the user terminal 1 via the Internet 2.

In response to this notification, in step S73, the start-up file obtaining section 55 of the user terminal 1 notifies a request for obtaining a start-up file for recovery for one package among the content data that can be recovered, to the service providing apparatus 3 via the communication section 58 and the Internet 2. In response to this notification, in step S83, the centralizing section 31 of the service providing apparatus 3 requests, via the Internet 2, the content supply apparatus 4 to create a start-up file for recovery for one package for which a recovery process is to be performed. In response to this request, in step S91, the start-up file management section 41 of the content supply apparatus 4 creates a start-up file for recovery.

In step S92, the start-up file management section 41 of the content supply apparatus 4 supplies the created start-up file for recovery to the centralizing section 31 of the service providing apparatus 3 via the Internet 2. In step S84, the centralizing section 31 outputs the supplied start-up file for recovery together with the user ID to the start-up file storage section 33 and requests the start-up file storage section 33 to store them. In response to this request, the start-up file storage section 33 stores the start-up file for recovery in such a manner as to correspond to the user ID.

In step S85, the centralizing section 31 of the service providing apparatus 3 supplies the start-up file for recovery, which is created by the content supply apparatus 4 and which is stored in the start-up file storage section 33, to the user terminal 1 via the Internet 2. The supplied start-up file for recovery is stored in the start-up file obtaining section 55.

In step S74, the content/license obtaining section 56 of the user terminal 1 accesses the URL (i.e., the content distribution section 42 of the content supply apparatus 4) at which the content data written in the musical-piece-to-be-recovered list file is downloaded and requests the supply of the content data forming the package for which a recovery process is to be performed. In response to this request, in step S93, the content distribution section 42 of the content supply apparatus 4 supplies (downloads) the requested content data to the user terminal 1 via the Internet 2. The downloaded content data is stored in the storage section 59 of the user terminal 1. On the other hand, the download determination section 57 of the user terminal 1 determines whether or not the requested content data has been downloaded normally, and the request of the download and the supply corresponding thereto are repeated until it is determined that the requested content data has been downloaded normally.

In step S75, the content/license obtaining section 56 of the user terminal 1 accesses the URL (i.e., the license distribution section 43 of the content supply apparatus 4) at which the license data written in the start-up file for recovery is downloaded and requests the supply of the license data. In response to this request, in step S94, the license distribution section 43 supplies (downloads) the requested license data to the user terminal 1 via the Internet 2. The downloaded license data is stored in the storage section 59 of the user terminal 1.

In step S76, the start-up file obtaining section 55 of the user terminal 1 requests, via the Internet 2, the centralizing section 31 of the service providing apparatus 3 to delete the start-up file for recovery, which is stored in the service providing apparatus 3. In response to this request, in step S86, the start-up file storage section 33 deletes the stored start-up file for recovery under the control of the centralizing section 31. Furthermore, under the control of the centralizing section 31, the customer information management section 32 increments by 1 the number of recoveries that are performed, which corresponds to the content ID of the content data whose download is completed, among the customer information of the user. At this stage, when the number of recoveries that can be performed and the number of recoveries that are performed, which corresponds to each content ID, among the customer information of the user, becomes equal, the content data in a state in which a recovery process is permitted does not exist. As a result, on the above-described home page for recovery dedicated to the user, the "recovery start button" is not displayed.

In step S87, the centralizing section 31 notifies the completion of the deletion of the stored start-up file for recovery to the user terminal 1 via the Internet 2.

In step S77, the user terminal 1 requests the centralizing section 31 of the service providing apparatus 3 to confirm the recovery continuation via the Internet 2.

In response to this request, in step S88, the centralizing section 31 confirms the recovery continued state of the user with respect to the customer information management section 32. More specifically, it is confirmed whether or not the content ID of the content data in which a recovery is permitted among the customer information of the user, managed by the customer information management section 32, exists. In step S89, the centralizing section 31 notifies the confirmation result in the process of step S86 to the user terminal 1 via the Internet 2.

In step S78, the content/license obtaining section 56 of the user terminal 1 determines whether or not the recovery should be continued on the basis of the notification result from the centralizing section 31. For this determination, when the content ID of the content data in a state in which recovery is permitted exists, it is determined that the recovery should be continued. Conversely, when the content ID of the content data in a state in which recovery is permitted does not exist, it is determined that the recovery should not be continued. When it is determined in step S78 that the recovery should be continued, the process returns to step S73, and processing of step S73 and subsequent steps is repeated.

When it is determined in step S78 that the recovery should not be continued, the process proceeds to step S79. In step S79, the information processing section 53 allows, for example, the display section 61 to perform a predetermined display, thereby notifying the user of the fact that the recovery process is completed. This completes the description of the recovery process by the content supply system.

The above-described recovery process can be stopped at any desired timing by the user. Also, the recovery process can be restarted from the content data whose download is stopped. In particular, when the package for which a recovery process is stopped is formed of a plurality of pieces of content data, the recovery process can be restarted in units of the content data from the middle of the package.

Figure 9:
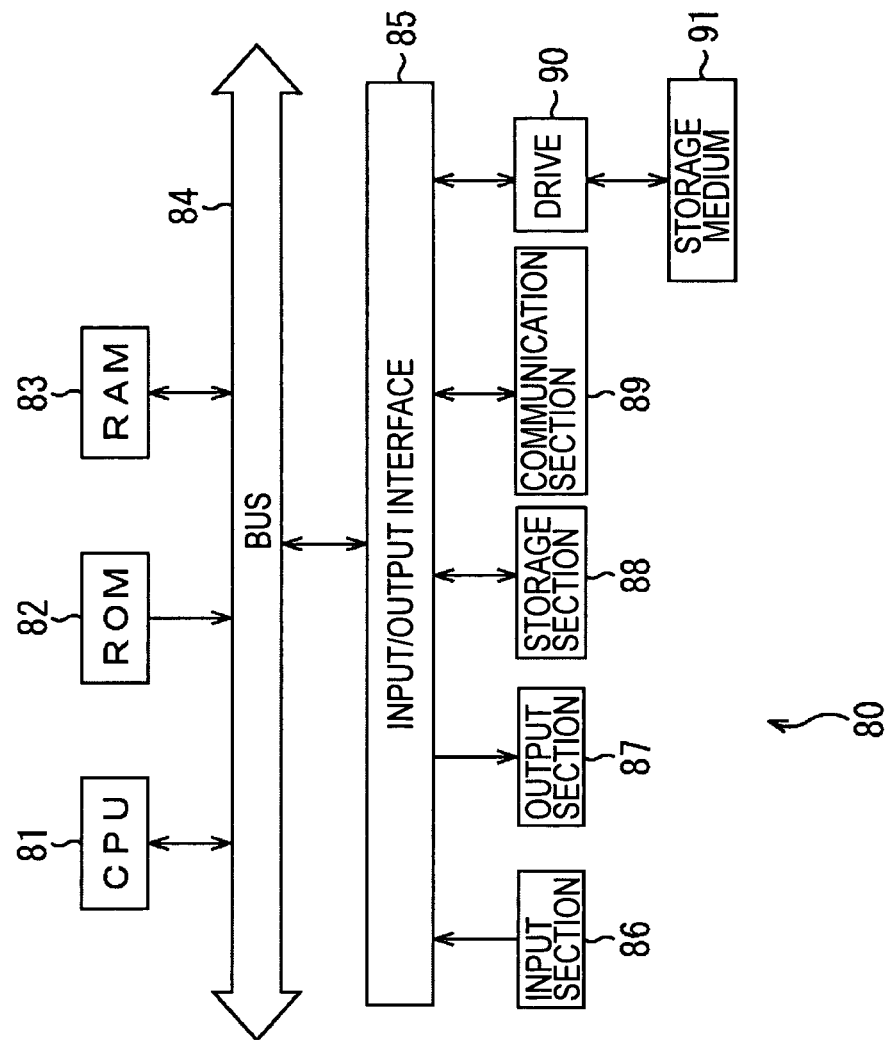
FIG. 9 is a block diagram showing an example of the configuration of a general-purpose personal computer.

The processing of each of the user terminal 1, the service providing apparatus 3, and the content supply apparatus 4 can be performed by hardware and can also be performed by software. When a series of processing is to be performed by software, the program forming the software is installed from a recording medium into a computer incorporated into dedicated hardware or into, for example, a general-purpose computer capable of performing various kinds of functions by installing various kinds of programs, as shown in FIG. 9.

The personal computer 80 incorporates a CPU (Central Processing Unit) 81. An input/output interface 85 is connected to the CPU 81 via a bus 84. A ROM (Read Only Memory) 82 and a RAM (Random Access Memory) 83 are connected to the bus 84.

Connected to the input/output interface 85 are an input section 86 including input devices such as a keyboard, a mouse, etc., for inputting an operation command by the user; an output section 87 including a display unit, such as a CRT (Cathode Ray Tube) or an LCD (Liquid Crystal Display) for displaying a video signal such as a home page; a storage section 88 including a hard disk drive for storing content data, license data, etc.; and a communication section 89, including a LAN (Local Area Network) adaptor, for performing communication processing via a network typified by the Internet 2. Furthermore, a drive 90 for reading and writing data from and to a recording medium 91, such as a magnetic disk (including a flexible disk), a optical disc (including a CD-ROM (Compact Disc-Read Only Memory) or a DVD (Digital Versatile Disc)), a magneto-optical disk (including an MD (Mini-Disc)), or a semiconductor memory, is connected to the input/output interface 85.

A program for enabling the personal computer to perform the above-described processing is supplied to the personal computer in such a manner that the program is stored on the recording medium 91, is read by the drive 90, and is installed into the hard disk drive incorporated in the storage section 88. The program installed in the storage section 88 is loaded from the storage section 88 into the RAM 83 in accordance with the instructions of the CPU 81, which correspond to the command from the user, which is input to the input section 86, and is executed.

In this specification, steps executed in accordance with a program may be executed chronologically according to the written orders. However, they do not have to be executed chronologically, and may be executed concurrently or individually.

The program may be processed by one computer or may be processed by a plurality of computers in a distributed manner. Furthermore, the program may be transferred to a distant computer and may be processed thereby.

In this specification, the system designates the entire apparatus formed of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. A content playback apparatus, comprising:
a memory configured to store content data after a first download of the content data from a content supply apparatus; and
a processor configured to:
request a second download of the content data from the content supply apparatus, when the content data downloaded during the first download has been erased,
receive recovery information from the content supply apparatus in response to the request for the second download, the recovery information indicating whether the second download is permitted,
request a start-up file from the content supply apparatus based on the received recovery information,
receive the start-up file from the content supply apparatus, the start-up file including a first location where the content data is stored in the content supply apparatus and a second location where license data corresponding to the content data is stored in the content supply apparatus, and perform the second download based on the start-up file, the second download comprising the content data and the license data,
wherein the recovery information indicates that the second download is permitted when a number of recoveries performed by the content playback apparatus is less than a maximum number of recoveries, and
the processor is further configured to request the content supply apparatus to delete the start-up file after the second download has been completed.

2. The content playback apparatus of claim 1, wherein the content data was erased from the content playback apparatus due to a failure of the content playback apparatus.

3. A content playback method comprising:
performing a first download of content data from a content supply apparatus;
storing the content data after the first download in a memory;
requesting a second download of the content data from the content supply apparatus, when the content data downloaded by the content playback apparatus during the first download has been erased;
receiving recovery information from the content supply apparatus, wherein the recovery information indicates indicating whether the second download is permitted;
requesting a start-up file from the content supply apparatus based on the received recovery information;
obtaining, receiving the start-up file from the content supply apparatus, the start-up file including a first location where the content data is stored in the content supply apparatus and a second location where license data corresponding to the content data is stored in the content supply apparatus;
performing the second download based on the start-up file, the second download comprising the content data and the license data;
storing the content data in the memory, wherein the recovery information indicates that the second download is permitted when a number of recoveries performed by the content playback apparatus is less than a maximum number of recoveries; and
requesting the content supply apparatus to delete the start-up file after the second download has been completed.

4. The content playback method of claim 3, wherein the content data was erased from the content playback apparatus due to a failure of the content playback apparatus.

5. Non-transitory computer-readable medium including program instructions, which when executed by a processor, performs a method for playing back content data comprising:
performing a first download of the content data from a content supply apparatus;
storing the content data in a memory after the first download; requesting a second download of the content data from the content supply apparatus, when the content data downloaded by the content playback apparatus during the first download has been erased;
receiving recovery information from the content supply apparatus the recovery information indicating whether the second download is permitted;
requesting a start-up file from the content supply apparatus based on the received recovery information;
receiving the start-up file from the content supply apparatus, the start-up file including a first location where the content data is stored in the content supply apparatus and a second location where license data corresponding to the content data is stored in the content supply apparatus;

performing the second download based on the start-up file, the second download comprising the content data and the license data; and storing the content data in the memory, wherein
the recovery information indicates that the second download is permitted when a number of recoveries performed by the content playback apparatus is less than a maximum number of recoveries, and the processor is further configured to request the content supply apparatus to delete the start-up file after the second download has been completed.

6. The computer-readable medium of claim 5, wherein the content data was erased from the content playback apparatus due to a failure of the content playback apparatus.

7. A content playback apparatus comprising:
a storage section configured to store content data after a first download of the content data from a content supply apparatus;
a request section configured to request a second download of the content data from the content supply apparatus, when the content data downloaded by the content playback apparatus during the first download has been erased;
a communication section configured to receive recovery information from the content supply apparatus in response to the request for the second download, wherein the recovery information indicates whether the second download is permitted;
a receiving section configured receive a start-up file from the content supply apparatus, the start-up file;
being requested by the request section based on the recovery information, and
including a first location where the content data is stored in the content supply apparatus and a second location where license data corresponding to the content data is stored in the content supply apparatus, based on the recovery information;
a download section configured to perform the second download based on the start-up file, the second download comprising the content data and the license data, wherein
the recovery information indicates that the second download is permitted when a number of recoveries performed by the content playback apparatus is less than a maximum number of recoveries, and
the content playback apparatus requests to delete the start-up file after the second download has been completed.

8. The content playback apparatus of claim 7, wherein the content data was erased from the content playback apparatus due to a failure of the content playback apparatus.

* * * * *